Figure 1:
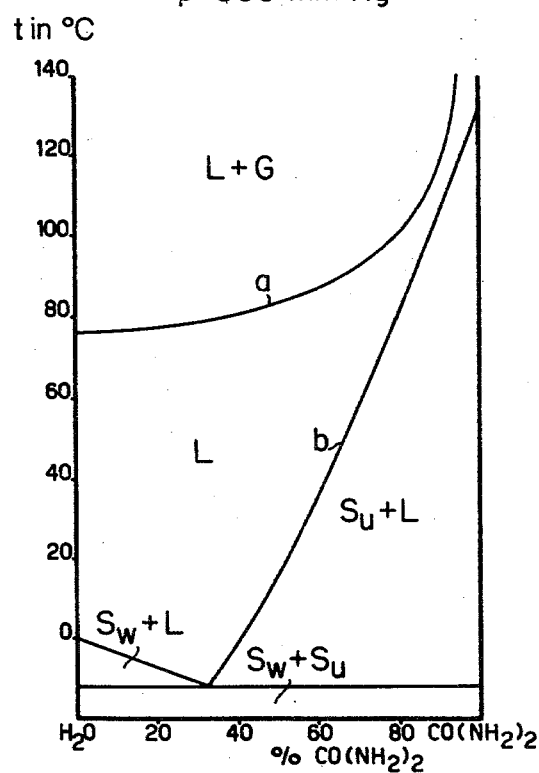

United States Patent Office 3,171,770
Patented Mar. 2, 1965

3,171,770
PROCESS FOR THE PRODUCTION OF SUBSTANTIALLY ANHYDROUS AND SUBSTANTIALLY BIURET-FREE UREA
Hendrik J. B. Biekart, Beek, Mathieu Bongard, Geleen, and Petrus J. C. Kaasenbrood, Sittard, Netherlands, assignors to Stamicarbon N.V., Heerlen, Netherlands
Filed Oct. 16, 1957, Ser. No. 690,503
Claims priority, application Netherlands, Oct. 26, 1956, 211,715
4 Claims. (Cl. 159—47)

This invention relates to the art of preparing urea. More specifically, this invention relates to the art of preparing concentrated urea solutions which are substantially water-free and also substantially free of biuret.

It is well known (see e.g., Bios Final Report No. 1443) that the urea solution produced in the urea synthesis, the urea content of which is about 77% by weight, may be evaporated discontinuously in two stages under a vacuum of 560 mm. and 120 mm. of Hg, respectively. This process will yield a concentrated urea melt which still contains about 4% by weight of water. By means of spraying the resulting melt it can be distributed into droplets, which, on cooling, are then converted into solid grains of about 1 to 2 mm. in diameter. The grains have to be dried because otherwise they would be too soft, giving rise to undesirable agglomeration during storage. This drying treatment may be omitted if the urea melt to be sprayed is itself practically water-free and contains less than say, about, 0.5% of water.

Up until now it was believed, however, that in evaporating urea solutions it was impossible to reach a concentration of over 96% by weight of the urea. This conclusion derived from the very common observation that upon attempts at further concentration the urea showed a marked tendency to decompose (see German patent application No. F12,609, published on November 17, 1955).

This decomposition results in the formation of biuret which proceeds according to the equation:

$$2CO(NH_2)_2 \rightleftharpoons H_2NCONHCONH_2 + NH_3\uparrow$$

This decomposition leads, of course, to ammonia losses which are most undesirable in the eventual utilization of the urea. Over and above such a disadvantage, however, is the fact that the presence of over 2% of biuret in the urea grain renders the product relatively unsuited as a fertilizer because of the herbicidal properties of the biuret.

It is also well known that the presence of only a few percent of biuret in urea will lead to disadvantages and difficulties during storage of the granulated urea product.

Accordingly, it is an object of this invention to provide a superior process for the production of concentrated urea in a relatively dry state and substantially free from biuret impurities, and also to produce such urea in the form of solid prills.

More specifically, it is an object of this invention to provide a novel process for the concentration of urea solutions wherein the final evaporation takes place under a pressure of less than 100 mm. of Hg. This novel process therefore employs what are normally considered unattractive and impractical low vacuums. We have discovered, however, that urea solutions can thereby be concentrated to a degree up to about 99.0 to 99.9% by weight of urea with an increase in biuret content of only at most 0.5%, absolute. These highly advantageous properties of the product outweigh what would be initially considered an economically most unattractive technique.

A study of the urea-water system has shown that at water-vapor pressures above about 200 mm. of Hg, the boiling point curves in the temperature-concentration graph lie above the crystallization curve, whereas at water-vapor pressure below about 200 mm. of Hg, the crystallization curve is intersected twice by the boiling point curves. The location of the boiling point curve and the crystallization curve confirms the fact, known from practice, that evaporation of a urea solution at a temperature not exceeding the melting point of urea, 132° C., and a pressure of 200 mm. of Hg can only yield a urea melt with, at most, 96% by weight of urea, that is, a melt which still contains 4% by weight of water. Further reduction of the water content at this pressure can be achieved only by a great increase in the temperature, which would, however, lead to decomposition and the formation of the contaminating and undesirable biuret.

As aforesaid, however, at a pressure less than 200 mm. of Hg, the crystallization curve is intersected twice by the boiling point curve. This means that if the evaporation is carried out in the temperature range between the said two points of intersection, also called the first or lower and second or higher boiling points, a urea solution cannot exist at the stated pressure. To the contrary, it will change spontaneously into solid urea and water vapor.

Figure 2:
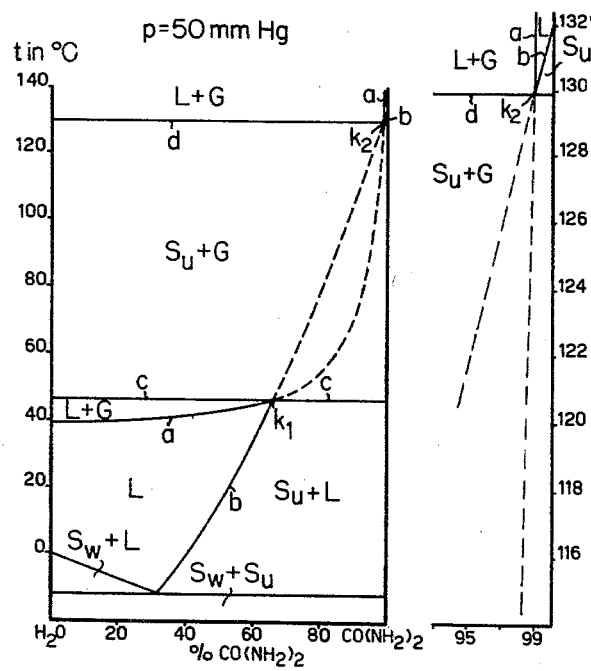

By way of further elucidation, temperature-concentration graphs for vapor pressures of 300 mm. of Hg and 50 mm. of Hg are shown in FIGURES 1 and 2. The temperature, in degrees centigrade, has been shown along the ordinate and the concentration, in percent by weight of urea, along the abscissa.

Figure 2A:
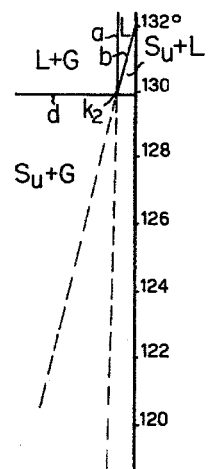

FIGURE 2a represents a detail of FIGURE 2 drawn to a larger scale. The solid phase areas in the graphs are marked "S," the areas where solutions occur are marked "L" and the vapor phase areas are marked "G." The subscripts "$u$" and "$w$" refer to urea and water, respectively.

The boiling point curves are indicated by the letter "$a$" and the crystallization curve by the letter "$b$." In the graph plotted for a pressure of 50 mm. of Hg, the boiling point curve intersects the crystallization, or melting point, curve at the points $K_1$ and $K_2$. Within the temperature range enclosed between lines $c$ and $d$ drawn through the points $K_1$ and $K_2$ and parallel to the abscissa, a urea solution cannot be stable and changes into solid urea and water vapor.

If additional heat is supplied to the system, the liberated urea and the water vapor formed may be raised in temperature but without any additional phase changes until the temperature of the second boiling point is reached. At that point, if additional heat is then supplied, the water vapor is condensed while the temperature remains constant. This phenomenon results from the formation of urea solution, the heat of condensation of vapor supplying the heat of formation of solution (or heat of dissolution of urea), said solution having the concentration indicated at the second boiling point in the graph. This back-formation of the solution, which is also known as retrograde-condensation, continues until all of the solid urea has been dissolved after which the temperature may increase further.

The characteristics of this system are such that it is equally possible to remove heat therefrom which, if the initial temeprature is above the first boiling point, will then lower the temperature to that level. Thereafter, water vapor is condensed while the temperature remains constant and a urea solution is formed having the concentration corresponding to the temperature for the first boiling point as indicated on the graph. After the urea has completely dissolved, and that solution has formed, the temperature will then be lowered on further removal of heat from the system.

Table I presents the temperature and urea concentrations corresponding to the first and second boiling points plotted for the various pressures, as indicated.

TABLE I

*Urea-water system*

| Pressure in mm. Hg | 1st boiling point | | 2nd boiling point | |
|---|---|---|---|---|
| | Temp., °C. | Concentration of the corresponding solution in wt.—percent urea | Temp., °C. | Concentration of the corresponding solution in wt.—percent urea |
| 20 | 26.5 | 55.6 | 131.5 | 99.5 |
| 40 | 41.0 | 63.0 | 130.0 | 99.1 |
| 50 | 46.4 | 65.3 | 129.9 | 98.8 |
| 80 | 59.0 | 70.9 | 127.6 | 98.1 |
| 100 | 66.0 | 74.0 | 125.7 | 97.6 |
| 150 | 80.5 | 80.2 | 119.9 | 95.5 |
| 170 | 86 | 92.6 | 116.7 | 94.0 |
| 200 | 105 | 90.3 | 105 | 90.3 |

It will be observed from this table that the higher the pressure, the closer will be the temperature for the first and the second boiling points. When the temperature reaches 200 mm. of Hg, these boiling points coincide. This is the point where the boiling point curve and the melting point curve meet one another at a temperature of 105° C. and at a urea concentration in the solution of 90.3%. The process of the present invention is based on the discovery that the transformation of the urea solution into solid urea and water vapor which occurs during the recited period of decreased pressure may advantageously be employed to produce urea melts of desirable purity and remarkably free of water content.

It will be seen that the present invention lies in the utilization of a vapor removal technique applied to concentrated urea solutions at pressures below a critical level of about 100 mm. Hg. If the vapor formed during this separation process is rapidly removed, either completely or substantially, with simultaneous melting and discharge of the "solid" phase, in which case the possibly remaining non-discharged water vapor will dissolve some of the remaining urea, a urea melt of very low moisture content will be obtained at lower temperatures than if a urea solution corresponding to that employed had been evaporated in the usual fashion, i.e., at the more elevated pressures and, accordingly, the more elevated temperatures. This principle can be illustrated by the following considerations in the form of a theoretical numerical example.

Let us assume that after evaporation under a vacuum greater than 200 mm. of Hg, a solution of a concentration of 94% by weight of urea has been obtained. This solution, at the saturation temperature of 113° C. is then fed into an evaporator in which the pressure is reduced to and maintained at 80 mm. of Hg and that heat is supplied thereto.

In accordance with the above described theory, 100 g. of the starting solution will then yeild, initially, 94 g. of solid urea and 6 g. of water vapor. The heat which is supplied in excess of that required to supply the heat of crystallization causes the temperature to rise to that of the second boiling point, 127.6° C. This point having been reached, part of the urea crystals will then combine with part of the water vapor to yield the 98.1% by weight solution corresponding to the second boiling point, i.e., retrograde condensation has occurred.

Any water vapor left in the evaporator after evacuation and the remainders of solid urea therein will, during the supply of heat, combine with each other to yield a 98.1% solution. If any solid urea has been left in the evaporator, there will be obtained a slurry of solid urea in the urea solution just mentioned with a gross concentration overall in the product greater than 98.1% by weight.

If the water vapor is removed quite rapidly from the evaporator, the degree of retrograde condensation can be considerably reduced and it is then possible, while melting the slurry, to obtain a melt with a moisture content of no more than 0.5%, and in most cases, somewhat less.

Preferably, the process of the present invention is practiced by starting with a urea solution concentrated so as to contain from 87 to 96% by weight of urea. Such a solution is then continuously fed into a vertical or an oblique tubular evaporator, the solution having a temperature not lower than 104° to 125° C., depending on the urea concentration, the desired temperature being some degrees above the solution saturation temperature. The pressure therein is lowered to a point less than 100 mm. of Hg. Preferably, the tubular evaporator is fitted with a stirrer which can then operate so as to smear the slurry of solid urea and urea solution which is formed against the inner wall of the evaporator where it melts and flows downwardly, the resulting melt being withdrawn or discharged below and the water vapor formed during this operation is continuously drawn off at the top of the evaporator. The evaporator wall, in such apparatus, is surrounded by steam jackets, an electrical heating element, or some other type equivalent heating device, capable of keeping the slurry layer on the inner side of the wall at the desired temperature and supplying at the same time the heat required for the operation. The amount of heat supplied will be sufficient to insure that the exit temperature of the evaporated melt will be, at the most, 145° C., and, preferably, between 132° and 137° C.

Temperatures above 145° C. should be avoided. Above that temperature there is an immediate increase in the formation of the undesirable biuret impurity.

A maximum feed concentration of 96% by weight of the urea is important since further evaporation by the normal process above that point will lead to the decomposition of urea and result in the formation of biuret as an impurity in the usual case. Any biuret formed as a result of such normal extended evaporation procedures will, of course, remain present in the product regardless of the later practice of the present inventive process.

It is, of course, possible to concentrate urea solutions having a concentration below the above noted 87% by weight. This is, however, economically unattractive as a result of the requirements for the discharge of the greater quantity of water vapor at the low pressures presently employed in the evaporator.

On the other hand, we have found that it is desirable to keep the concentration of the solution to be treated according to the process of the present invention below 95% by weight. This is especially so if one desires a final product with a very low water content, i.e., 0.5 to 0.2% by weight. If solutions having a urea content greater than 90.3% by weight are subjected to the process of the present invention, we have found that the heat liberated during crystallization of the urea will exceed the heat required for the simultaneous formation of water vapor. The higher the concentration of the urea solution, above 90.3% by weight, the greater will be the heat surplus immediately after the separation of the solution into solid urea and water vapor. If urea solutions of over 95% by weight of urea are employed, this heat surplus becomes so great, and the temperature inside the evaporator increases so rapidly, that the temperature of the second boiling point is reached before even a large portion of the water vapor produced can be removed. As a result, additional solution will form by retrograde condensation than is desirable for obtaining a low moisture content in the melt. If urea solutions with a concentration of over 95% by weight are fed into the evaporator, it is, however, possible to obtain a melt with a moisture content of less than 0.5% if the pressure in the evaporator is maintained at a very low level, for instance, from about 20 to 40 mm. of Hg.

In view of the above observations, and from an economical consideration, it is desired, for best operations, to employ urea solutions having a concentration of from about 90 to about 94.5% by weight of the urea and subject them in the evaporator to pressures of from about 50 to 80 mm. of Hg.

The rapid discharge and removal of the water vapor produced in the evaporator during the formation of the urea melt may be promoted by admitting to the lower part of the evaporator, and countercurrent to the discharge of the melt, a relatively small flow of a gas which has no detrimental effect on the urea. The gas operates to carry off the water vapor, and a flow rate of 5 to 25 liters per kg., of urea is preferred. Gases which may be used for this purpose are, for instance, air, nitrogen, carbon dioxide, carbon monoxide and ammonia. Ammonia is desired since it produces an ammonia-vapor pressure in the evaporator and therefore induces a retarding effect on biuret formation, the latter occurring by the above noted reaction which produces as a by-product one mol of ammonia for each mol of biuret formed.

The following examples are presented by way of further illustration of the process of the present invention. All percentage figures therein are percent by weight. It will be appreciated, of course, that this invention is not limited to the specific embodiments illustrated in these examples.

EXAMPLE I

An aqueous solution of urea, 600 kg., at a temperature of 122° C. and having a concentration of 94.5% and containing 0.3% biuret, was admitted into a tubular evaporator of 2 meters in length in 30 centimeters in internal diameter. The pressure inside the evaporator was maintained at 55 mm. of Hg. The melt was removed from the evaporator in the manner hereinbefore described at a temperature of 136° C. The moisture content of this melt was 0.45% and the biuret content thereof only 0.7%.

EXAMPLE II

The procedure of Example I was carried out with a urea solution of 95% concentration at a temperature of 123° C. and at a pressure of 65 mm. of Hg and with the simultaneous introduction of ammonia countercurrent to the discharge of the urea melt. The melt exited at a temperature of 136.5° C. and had a moisture content of 0.3%. In this example the increase in biuret content amounted to about 0.4% absolute. The ammonia was introduced at a rate of about 6.5 liters per kg. of urea melt obtained.

EXAMPLE III

The procedure of Example II was followed employing a urea solution having a concentration of 93.4% at a temperature of 120° C., but a larger amount of ammonia was admitted into the evaporator which was maintained at a pressure of 100 mm. of Hg. The urea melt was removed at a temperature of 137° C. and had a moisture content of only 0.20%. The biuret content had increased from 0.3% to only 0.65%. In this example the rate of ammonia introduction was 19.5 liters per kg. of urea melt obtained.

EXAMPLE IV

The procedure of Example III was followed except that instead of the ammonia gas, there was introduced 24 liters of air per kg. of ammonia. Comparable results were obtained.

This invention also contemplates producing the anhydrous urea product in the form of solid globules, of, for instance, about 2 mm. diameter, so-called urea prills. This is done by dividing the initial melt product, as from any of the above examples, into globules and then converting the globules into urea prills by cooling them. The conventional techniques can be employed for this latter step, as known to those skilled in the art. For instance, the globules may be cooled during a free fall through a body of air.

It will be appreciated that the foregoing specific embodiments and description are provided to illustrate the principles of this invention which are in turn, however, subject to extensive change within the skill of the art without however, departure from such principles. Therefore, this invention includes all modifications encompassed within the spirit and scope of the following claims.

We claim:

1. A process for the production of substantially anhydrous urea in the form of solid globules having a moisture content of less than 0.5% by weight which comprises concentrating an aqueous urea solution to a concentration of about 87 to 96% by weight of urea in a vacuum at a pressure in excess of 200 mm. of Hg and thereafter subjecting said concentrated solution while at a temperature not less than about 104° C. to about 125° C. to a second evaporation in a second stage under a vacuum less than 100 mm. of Hg while removing the water vapor therefrom so as to provide a slurry of solid urea in a urea solution, converting said slurry of urea into a melt and removing said melt while continuously supplying heat thereto, controlling said supply of heat so that the exit temperature of said melt is maintained below 145° C., dividing the melt into globules and converting said globules into urea prills by cooling said globules.

2. The process of claim 1 wherein said urea solution is concentrated in said first stage to a concentration of from about 90 to 94.5% by weight and the pressure in said second stage is maintained at from about 50 to 80 mm. of Hg.

3. The process of claim 1 wherein a gas is introduced countercurrent to the discharge of said urea melt.

4. The process of claim 3 wherein said gas is ammonia.

References Cited in the file of this patent

UNITED STATES PATENTS

| | | |
|---|---|---|
| 1,956,138 | Staib | Apr. 24, 1934 |
| 2,267,133 | Porter | Dec. 23, 1941 |
| 2,327,333 | Kirkpatrick | Aug. 7, 1943 |
| 2,643,180 | Miller | June 23, 1953 |
| 2,890,155 | Bueche | June 9, 1954 |
| 2,712,557 | Michelitsch | July 5, 1955 |
| 2,744,133 | Cramer | May 1, 1956 |
| 2,800,177 | Miller | July 23, 1957 |
| 2,857,962 | Rogers | Oct. 28, 1958 |

FOREIGN PATENTS

| | | |
|---|---|---|
| 177,056 | Great Britain | Mar. 23, 1922 |
| 189,787 | Great Britain | Sept. 9, 1923 |

OTHER REFERENCES

Perry's "Chemical Engineers' Handbook," 3rd ed., McGraw-Hill, New York (1950), pp. 508–10.